United States Patent [19]

Crissy et al.

[11] Patent Number: 4,786,223
[45] Date of Patent: Nov. 22, 1988

[54] VEHICLE HOLD-DOWN SYSTEM

[75] Inventors: Charles F. Crissy; John D. Boland, both of Jackson, Mich.

[73] Assignee: Aeroquip Corporation, Jackson, Mich.

[21] Appl. No.: 107,671

[22] Filed: Oct. 13, 1987

[51] Int. Cl.⁴ .................................................. B60P 3/07
[52] U.S. Cl. ...................................... 410/20; 410/10; 410/30
[58] Field of Search ..................... 410/3, 4, 7, 8, 9, 10, 410/11, 12, 16, 19, 20, 21, 23, 30, 47, 49, 50

[56] References Cited

U.S. PATENT DOCUMENTS

| | | | |
|---|---|---|---|
| 1,131,477 | 3/1915 | Crofoot | 410/4 |
| 1,990,562 | 2/1935 | Otis | 410/20 X |
| 2,062,243 | 11/1936 | Williams | 410/16 X |
| 4,147,113 | 4/1979 | Kilgus | 410/8 |
| 4,227,633 | 10/1980 | Sellberg | 410/19 X |
| 4,659,266 | 4/1987 | Thelen et al. | 410/19 X |

OTHER PUBLICATIONS

Photograph of Thrall Car Wedge Harness Assembly.

Primary Examiner—Gerald A. Michalsky
Attorney, Agent, or Firm—Beaman & Beaman

[57] ABSTRACT

A system for immobilizing vehicles having pneumatic tires during shipment utilizing tire chocks on each side of the tire and a flexible web harness passing over the tire upper circumference having ends affixed to the chocks. A winch mounted upon one chock tensions the harness while a quick-release fitting at the other end of the harness attaches to the other chock. The configuration of the quick-release fitting, the type of tensioning winch employed, the relationship of the winch to its associated chock and the construction of the harness are all features of the invention.

9 Claims, 3 Drawing Sheets

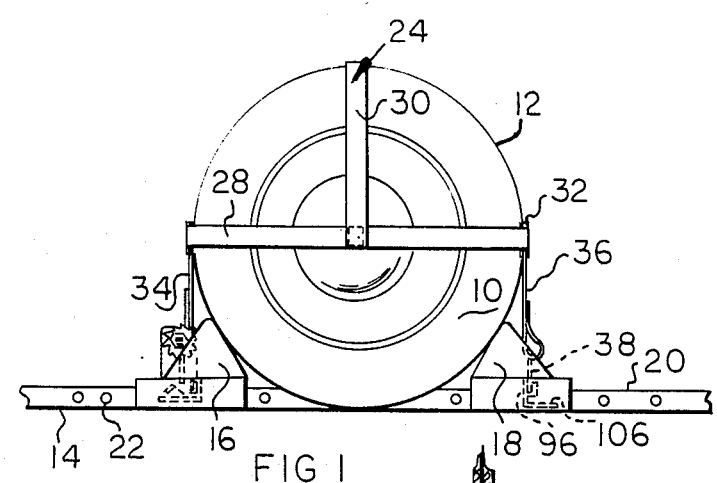
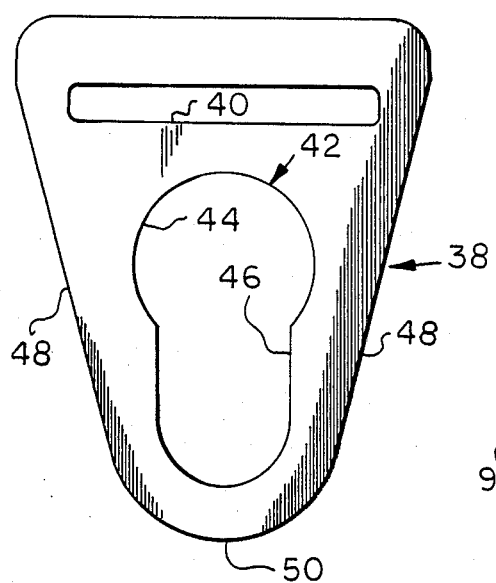
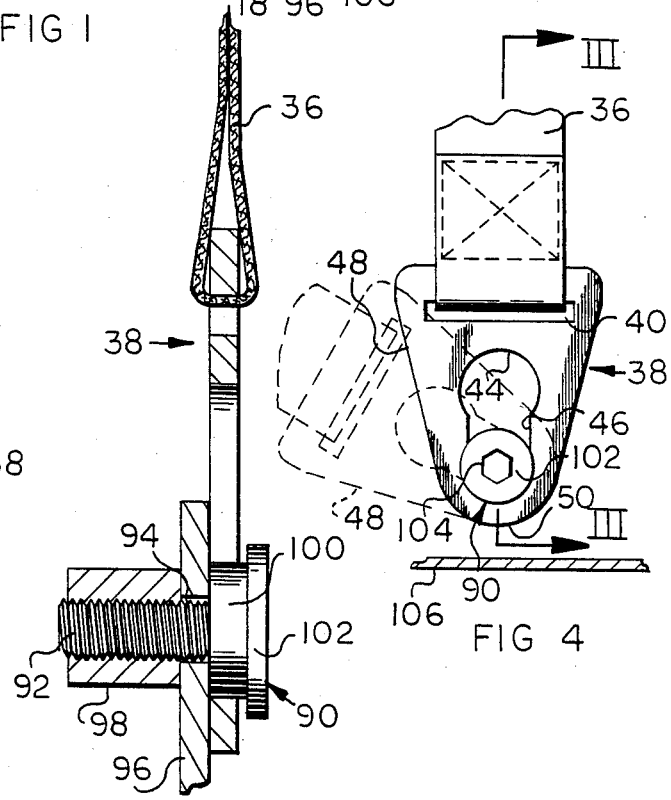
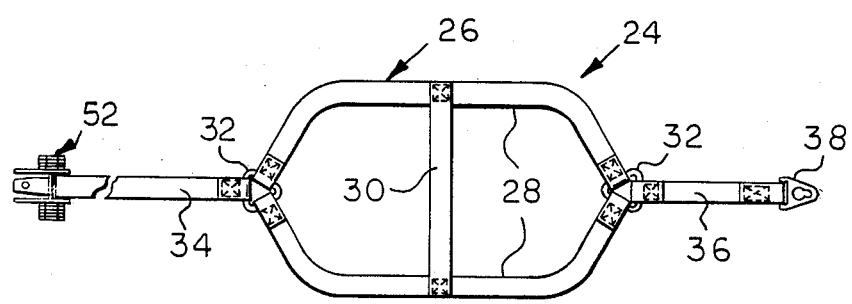
FIG 1
FIG 2
FIG 3
FIG 4
FIG 5

VEHICLE HOLD-DOWN SYSTEM

BACKGROUND OF THE INVENTION

Pneumatic tire mounted vehicles such as automobiles and trucks are commonly shipped by rail, truck and boat. Hold-down apparatus is employed to stabilize the vehicles during shipment, and commonly, such hold-down apparatus includes chains connected to the vehicle frame or under-structure and the floor or deck of the supporting vehicle tensioned by levers, reels, turnbuckles or the like. Such apparatus may also employ chocks bearing against the lower region of the tires.

Hold-down systems consisting of chains or the like interposed between the vehicle frame and the supporting deck usually exert such a downward force upon the vehicle as to "bottom out" the vehicle suspension system and render the suspension system ineffective with respect to the absorbing of shocks and vibrations. Hold-down systems of this type which render the vehicle suspension system inoperative are undesirable in view of the present extensive use of computers and other relatively sensitive electronic equipment which is adversely affected by vibration and impact, but which is, normally, protected from such impact and vibration by the vehicle suspension. Rendering the vehicle suspension inoperative often results in damage to such sensitive vehicle components during shipping.

A vehicle hold-down system has been proposed for stabilizing and firmly positioning pneumatic tire vehicles on the deck of a shipping vehicle wherein the vehicle suspension is utilized to cushion the vehicle and its associated components with respect to the supporting deck. Such a system utilizes chocks to prevent rotation of the tires, and a harness extending over the upper portion of the tire holds the tire firmly to the deck, but does not adversely affect the vehicle suspension movement.

Such hold-down systems solely engaging the vehicle tires require that the chocks and harness be removed when releasing the secured vehicle, and the hold-down components must be stored when not in use. The time required to assemble the chocks and holddown harness, and the ease with which these components may be assembled becomes significant from a cost and safety standpoint, and present systems of this type can be significantly improved.

It is an object of the invention to provide a vehicle holddown system by retaining vehicle tires wherein a flexible harness is tightly drawn down upon the vehicle tire, and the harness is attached to tire chocks located upon opposite sides of the tire wherein a winding buckle or winch is used to tension the harness, and wherein the winch is of a light, concise configuration, mounted upon a chock in a self-aligning manner utilizing conventional chock fittings, and wherein the winch uses a pushto-release or a lift-to-release dog to remove the harness tension.

Another object of the invention is to provide a vehicle hold-down system employing a pair of chocks retaining a vehicle tire wherein a flexible harness passing over the tire has opposite ends each affixed to a chock, one end being associated with tensioning means, while the other end utilizes a quick-release fitting readily attachable to and removed from a chock and of simplified economical construction, the configuration of the fitting reducing the likelihood of inadvertent disconnection from the associated chock but readily operable for release from the chock when desired.

A further object of the invention is to provide a vehicle hold-down system utilizing a pair of chocks with a vehicle tire having a flexible harness extending over the tire having ends attached to the chocks wherein the harness employs single end straps and a double strap basket located between the end straps contacts the tire, the basket straps being associated with the end straps through a Delta ring arrangement which uniformly divides the tension forces between the associated end straps and basket straps and maintains the harness straps in the desired orientation when the harness is either under tension or in a relaxed condition.

In the practice of the invention a pair of tire-engaging chocks are located upon opposite sides of the periphery of a vehicle pneumatic tire to prevent rolling of the tire upon a supporting deck, such as found on a railroad car, auto carrier truck, ship partition or the like. Such chocks restrain the vehicle wheels from rolling in either direction. The chocks are releasably attached to the supporting deck, and the chock construction, per se, forms no part of the instant invention.

A flexible harness formed of woven web material, such as nylon, or the like, capable of transmitting high tension forces extends over the upper circumference of the tire and includes a central region defining a basket engaging the upper portion of the tire, and two end straps each having an end affixed to the basket, and a free end. One of the strap free ends is associated with a winch or buckle reel mounted upon a chock wherein tension forces may be applied to the harness upon the winding of the strap upon the reel. The other harness end strap includes a fitting releasably attached to the other chock. Thus, the strap ends of the harness are anchored to the chocks and tensioning of the harness pulls the tire downwardly into firm engagement with the supporting deck and the associated chocks.

The chocks each include identical anchoring pins. One of the pins extend through a base plate defined in the tensioning buckle permitting the buckle to pivot thereon, and this relatively loose interconnection between the buckle and associated chock permits the buckle to readily align itself with the tension forces within the associated web strap end.

The other chock includes an identical anchor pin having a head and the strap end fitting includes a keyhole-type opening adapted to receive the anchor head and a reduced diameter portion or stem in which the pin stem is received. The fitting can only be removed from the anchor pin, or placed thereon, upon alignment of the larger fitting opening with the anchor head, and the configuration of the fitting is such that interference occurs with the associated chock to prevent release of the fitting from its pin unless the fitting is oriented in a particular manner to the associated chock and pin.

The harness includes a pair of parallel straps defining a basket, and a bridge member interconnects the central region of the basket straps. The ends of the basket straps are connected to Delta rings which are also connected to the inner ends of the harness end straps, and the use of the Delta rings aids in properly maintaining and orienting the basket straps relative to the tire during tensioning, and also aids in minimizing tangling of the harness components during storage and handling.

The buckle used to tension the harness is of a concise configuration preferably formed of stamped sheet metal components for purpose of economy and strength. The buckle includes a reel having unidirectional rotation under control of a spring biased dog or detent, and an actuating lever mounted upon the buckle retracts the dog from the reel ratchet teeth.

As will be later appreciated from the detailed description, the improved vehicle hold-down system achieves the desired objects at a minimum cost, and with apparatus readily operable with minimum skills.

BRIEF DESCRIPTION OF THE DRAWINGS

The aforementioned objects and advantages will be apparent from the following description and accompanying drawings wherein:

FIG. 1 is a side, elevational view of a vehicle wheel being held down by the vehicle hold-down system of the invention, FIG. 2 is an enlarged, elevational view of the strap quick release end fitting, FIG. 3 is an elevational, sectional, detailed view taken through the strap end fitting and anchor along Section III—III of FIG. 4, FIG. 4 is an elevational view of the end fitting and associated anchor bolt illustrating the release position in dotted lines, FIG. 5 is an elevational view of the web tire harness, per se, used with apparatus of the invention.

DESCRIPTION OF THE PREFERRED EMBODIMENTS

Figure 6:
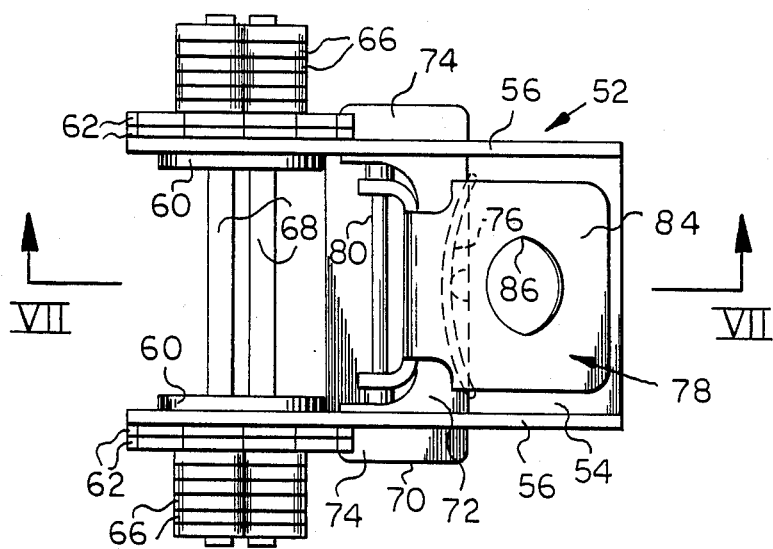
FIG. 6 is a plan view of a tensioning push-to-release buckle or winch, per se.

The general arrangement of the components used in the vehicle hold-down system of the invention is shown in FIG. 1. A pneumatic vehicle tire is illustrated at 10, and includes a circular periphery 12 defined by the tire tread. The tire 10 is, of course, associated by a conventional suspension system, not shown, with an automobile or truck, not shown, and when using a hold-down system of this type the vehicle suspension is fully operable and capable of protecting the vehicle frame and chassis from the shock and vibration imposed upon the supporting deck or floor 14 as exists in the vehicle cargo compartment of a rail car, truck, boat or the like.

A pair of chocks 16 and 18 are mounted upon the supporting deck 14 by rail 20 attached to the deck. The rail 20, provided with holes 22, and a lock such as a retractable plunger, not shown, is movably mounted upon the associated chock for being selectively received within a rail hole for positioning the chocks to the tire and fixing the chocks relative to the deck 14. The construction of the chocks 16 and 18 forms no part of the instant invention, and the use of the rail 20 and locking plunger is well known and forms no part of the instant invention.

A flexible harness generally indicated at 24 is interposed between the chocks 16 and 18 associated with a common tire 10, and the harness is tensioned to hold the associated tire between the chocks and impose a downward force upon the tire to insure engagement thereof with the chocks and firmly retain and locate the associated vehicle, not shown, within the transporting vehicle.

The harness 24 is best shown in FIG. 5 and is formed of high strength webbing and includes a central region comprising a basket 26 formed by straps 28 which are substantially parallel to each other and interconnected by a flexible bridge strap 30 sewn thereto. The ends of the basket straps 28 are sewn with loops for connecting to the Delta rings 32, as will be appreciated from the drawing. A tension strap 34 is connected to the base of a Delta ring 32 while a fitting strap 36 is connected to the base of the other Delta ring 32.

The free end of the strap 36 is sewn with a loop for attaching the metal anchor fitting 38 thereon. The fitting 38 is formed of plate material, and as will be appreciated from FIG. 2, includes a slot 40 receiving the looped free end of the strap 36. The fitting 38 also includes a keyhole-shaped opening generally indicated at 42 which includes a circular portion 44 intersected by a reduced dimension stem portion 46 having parallel sides. The fitting 38 is provided with angularly disposed sides 48 interconnected at rounded apex 50, and the dimensional relationship of the sides 48 to the opening 42 is of significance as will be later explained.

Tensioning of the harness 24 is achieved by the winch or buckle 52 affixed to chock 16.

Figure 7:
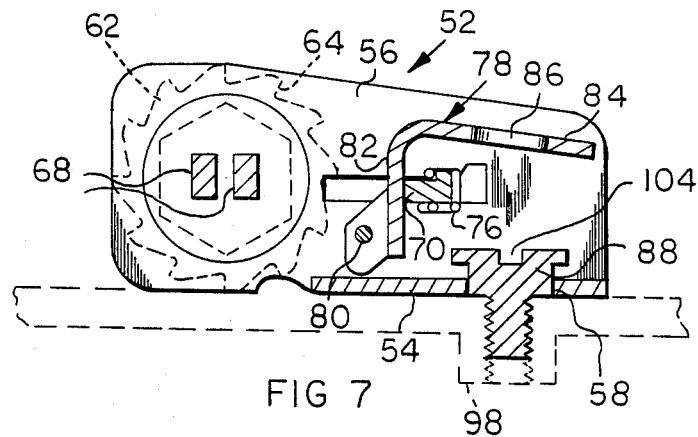
FIG. 7 is an elevational, sectional view of the buckle of FIG. 6 taken along Section VII—VII shown in the horizontal position.
Figure 8:
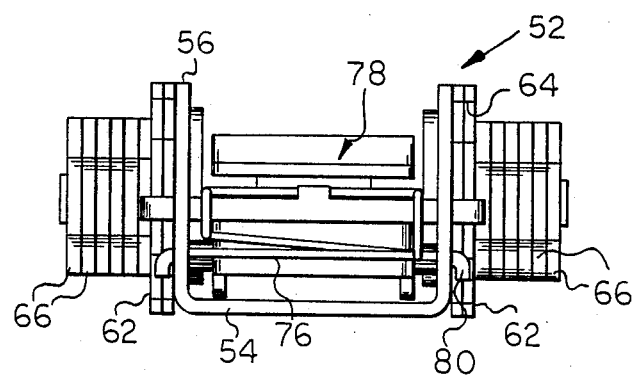
FIG. 8 is an end elevational view of the buckle as taken from the right of FIG. 6.

The buckle 52 includes a sheet metal frame of a U-configuration having a base 54 and side portions, FIG. 8. The base 54 is provided with a circular opening 58 for cooperation with a chock anchor pin, as later described. The sides 56 are provided with aligned circular openings for rotatably receiving the circular bearing plates 60 for the reel assembly. The reel includes ratchet wheel plates 62 disposed on the outside of the sides 56 having teeth 64 as will be seen in FIG. 7, each ratchet wheel being formed by two sheet metal plates welded together.

Torque transmitting plates 66 are welded together and extend outwardly from the ratchet wheels and are of a hexagonal configuration, FIG. 7, so as to receive a conventional wrench socket. The entire reel assembly includes a pair of elongated rods 68 extending therethrough and bridging the sides 56 in a spaced relationship for receiving the end of the strap 34 therebetween. Thus, it will be appreciated by sliding a wrench socket on plates 66 that the reel apparatus may be rotated in a counterclockwise direction as viewed in FIG. 7.

Each of the side plates 56 is provided with aligned generally rectangular openings in which the dog or lock pawl 70 is reciprocally mounted. The pawl 70 is of a general U-configuration having a base 72 and legs 74 are in alignment with the ratchet wheel teeth 64 for engagement therewith. Spring 76 bears upon the rear base edge of the pawl biasing the pawl 70 toward the ratchet wheels 62 for engagement of the pawl legs 74 with the teeth 64. The configured spring includes free ends received within holes defined in the sides 56.

The lock pawl 70 is actuated by a release lever 78 mounted upon a pivot shaft 80 interposed between frame sides 56. The release lever includes a portion 82 extending toward the base 54 having an opening through which the pivot shaft extends, and as will be appreciated from FIG. 7, the portion 82 is of a general U-configuration having portions disposed adjacent the sides 56 in which the pivot pin receiving openings are defined. The release lever 78 also includes the portion 84 of planar configuration having an opening 86 defined therein substantially in alignment with the center of the opening 58. A compressive force applied to the release lever portion 84 to force the portion 84 toward the base 54 causes a pivoting of the release lever engaging the portion 82 against the locking pawl base 72 displacing the locking pawl to the right, FIG. 7, to release the pawl from the reel ratchet teeth 64. Thus, a push-to-release action is achieved for releasing the locking pawl from the ratchet wheels.

The buckle 52 and the fitting 38 are attached to their associated chocks 16 and 18, respectively, by the identical anchor pins 88 and 90 best shown in FIG. 3. The anchor pins include a threaded stem 92 which extends through an opening 94 formed in a plate 96 of the chock and a tubular internally threaded nut 98 welded to the chock plate receives the anchor pin threaded stem. The anchor pin head is of a cylindrical configuration and engages plates 96 and terminates in the enlarged circular flange 102. A hexagonal Allen wrench engaging recess 104 is defined in the flange for rotating the anchor pin and tightening the same to its associated chock plate.

The anchor pin 88 used to connect the buckle 52 to the chock 16 is received within the buckle base opening 58 as will be apparent from FIG. 7. Tightening of the anchor pin 88 is readily accomplished by extending a wrench through the release handle opening 86. The axial dimension of the anchor pin head 100 is greater than the thickness of the base 54, and as the diameter of the opening 58 is slightly greater than that of the head 100 the buckle will be somewhat loosely mounted upon the chock 16 permitting the buckle 52 to pivot about the anchor pin, and adjust itself in a direction parallel to the anchor pin axis, and in this manner the buckle will readily automatically align itself with the tension forces produced in the strap 34 during tightening of the harness 24 on the tire 10.

The anchor pin 90 is mounted to the chock 18 in the manner illustrated in FIG. 3, and the fitting opening portion 44 is slightly larger in diameter than the diameter of the anchor pin flange 102. Likewise, the width of the opening portion 46 is only slightly greater than the diameter of the anchor pin head 100 and the axial dimension of the anchor pin head is slightly greater than the thickness of the fitting 38.

As appreciated from FIG. 4, the anchor pin 90 is so positioned to a plate 106 formed on chock 18 that the fitting 38 may not be released from the pin 90 unless the fitting is pivoted to the dotted line position shown in FIG. 4 which permits a shifting of the fitting 38 in the direction of the length of the stem opening portion 46 sufficiently to align the anchor flange 102 with the opening portion 44 and permit the fitting to be removed from the anchor pin 90. Likewise, when placing the fitting upon the anchor pin 90 this orientation of the fitting to the chock plate 106 is required. Under conditions of normal use the fitting will not be aligned with plate 106 to permit the fitting to be removed from the anchor pin as shown in full lines in FIG. 4, and the aforedescribed relationship substantially eliminates inadvertent disconnection of the fitting from the anchor pin 90 even when the harness is untensioned.

To achieve the desired hold down of the tire 10 to the deck 14 the harness 24 is placed over the upper portion of the tire periphery 12 in the manner shown in FIG. 1. It is noted that the basket straps 28 are located on the lateral sides of the tire, while the bridge strap 30 extends over the tire circumference. The harness strap 34 is placed within the buckle reel between rods 68, and the strap 36 having the fitting 38 is connected to the chock 18 by placing the fitting over the anchor pin 90 as apparent from FIGS. 1, 3 and 4. Thereupon, rotating of the buckle reel by a ratchet wrench applied to the torque plates 66 tensions the harness sufficiently to produce the desired downward pull on the tire 10 to maintain firm engagement with the deck 14 and the chocks 16 and 18. Of course, such restraint of the tire in no way affects the operation of the vehicle suspension.

When it is desired to release the tire 10 the buckle release handle portion 84 is pushed with the thumb, or the finger, toward the base 54 biasing the locking pawl 70 out of engagement with the ratchet teeth 64 permitting the reel to readily rotate to release the tension on the harness and permit the strap 34 to be completely pulled free of the buckle 52.

Usually, when not in use, the harness and chocks will be stored and the apparatus may be readily stored in an out-of-the-way manner so as not to interfere with unloading of the vehicles being transported.

The identical anchor pins 88 and 90 are conventionally used with this type of chock, but are not employed in the described manner. The use of the conventional anchor pins permits the vehicle hold-down system of the invention to qualify for use under previous government safety standards.

The use of the Delta rings 32 significantly aids in achieving the desired relationship of the harness and basket straps to the tire during tensioning and the Delta rings 32 evenly distribute the forces imposed upon the harness improving the life and wear characteristics thereof.

Figure 9:
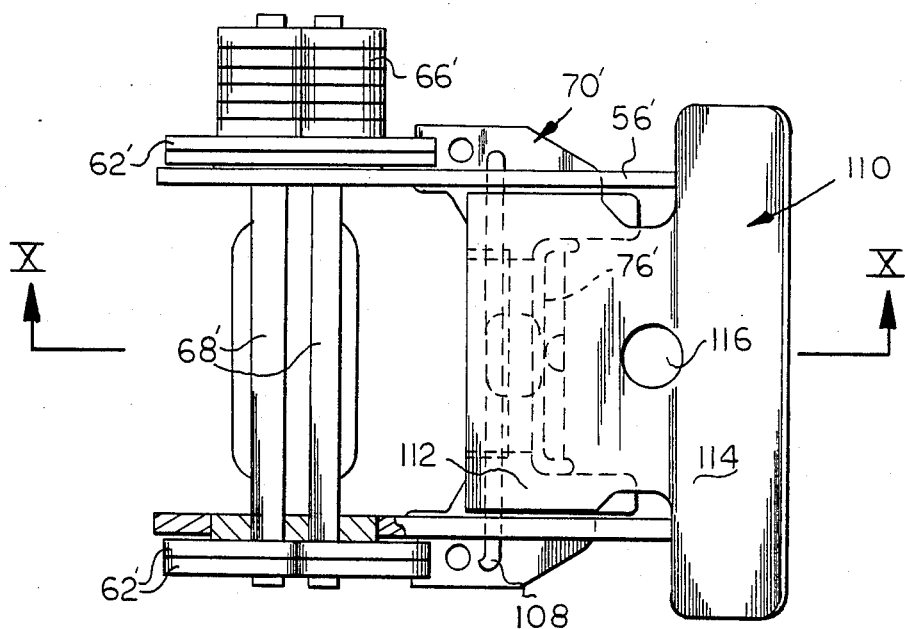
FIG. 9 is a plan view of another embodiment of buckle of the lift to release type.
Figure 10:
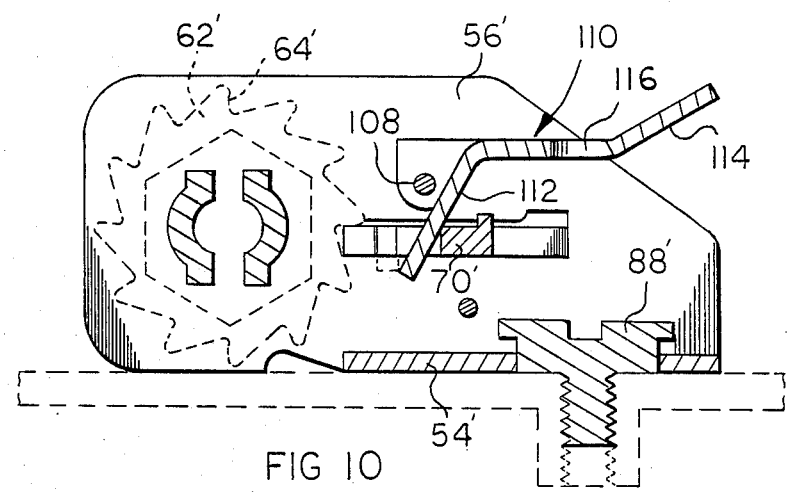
FIG. 10 is an elevational, sectional view of the buckle of FIG. 9 taken along Section X—X.

In FIGS. 9 and 10 a variation in the construction of the tensioning buckle is illustrated wherein a lift-to-release buckle is shown. In the embodiment of FIGS. 9 and 10 buckle components substantially identical to those previously described are indicated by primed reference numerals, and it will be appreciated that in this embodiment only a single set of torque plates 66' are mounted upon the buckle reel.

The release lever is mounted upon the pivot shaft 108 bridging the buckle side portions 56', and the release lever, generally indicated at 110, includes a portion 112 extending toward the buckle base 54' engaging the base of the pawl 70', and the lever handle portion 114 is of an enlarged configuration readily accessible to the operator. An opening 116 is defined in the handle portion 114 to permit a wrench to be inserted into the wrench receiving recess of anchor pin 88'.

When it is desired to disengage the pawl 70' from the ratchet wheels 62' the operator manually "lifts" the handle portion 114 which displaces the pawl 70' within its slot disengaging the pawl from the ratchet wheel teeth and permitting the buckle reel structure to freely rotate to remove the tension on the harness and permit the harness strap 34 to be released from the buckle.

Whether a push-to-release buckle operation or a lift-to-release movement is desired to release the harness tension is a matter of choice and either type of buckle is suitable with the vehicle hold-down system of the invention.

It will be appreciated that various modifications to the inventive concepts will be apparent to those skilled in the art without departing from the spirit and scope of the invention.

We claim:

1. A vehicle hold-down system for vehicles supported on pneumatic tires having a circumference comprising, in combination, a tire supporting surface, first and second chock means fixed adjacent said supporting surface on opposite sides of the tire in alignment with the tire circumference, a flexible harness adapted to be placed over the tire upper circumference, said harness including first and second straps and a central region, harness tension means interconnecting said first strap to said first chock, a quick release fitting attached to said second strap, said fitting comprising a flat plate, an opening within said plate, anchor means defined on said second chock, said anchor means being received within said fitting opening for attaching said second strap to said second chock.

2. In a vehicle hold-down system as in claim 1, said fitting opening having communicating anchor means receiving and anchor means retaining portions, said anchor means being locked to said fitting when received within said fitting opening anchor retaining portion.

3. In a vehicle hold-down system as in claim 2, locking means defined upon said fitting, said locking means cooperating with said second chock preventing movement of said fitting in a direction to shift said anchor means from said opening anchor means retaining portion to said anchor means receiving portion unless said fitting is oriented to said second chock in a predetermined manner.

4. In a vehicle hold-down system as in claim 3, said locking means comprising at least one orientation surface defined on said fitting.

5. In a vehicle hold-down system as in claim 2, said fitting opening being in the form of a keyhole having a circular portion and a radial portion, said circular portion comprising said anchor means receiving portion and said radial portion comprising said anchor means retaining portion.

6. In a vehicle hold-down system as in claim 1, said harness tensioning means comprising a winch having a rotatable reel, said first strap being wound upon said reel, reel rotating means defined on said reel, ratchet teeth defined on said reel, a dog movably supported on said winch movable between teeth engaging and release positions, and a dog actuator mounted on said winch for moving said dog from said teeth engaging to said release position actuated by a compression push force.

7. In a vehicle hold-down system as in claim 6, said dog actuator comprising a lever pivotally mounted upon said winch, said lever including a push-to-release handle portion.

8. In a vehicle hold-down system as in claim 6, said winch including a U-shaped frame having legs and a base, said reel being mounted upon and extending between said legs, an opening defined in said base, and an anchor pin extending through said base opening pivotally mounting said winch upon said first chock.

9. In a vehicle hold-down system as in claim 1, said harness being formed of flexible webbing straps, said central region including a pair of central straps each having ends and interconnected by a bridge strap, one end of each central strap being connected to a first Delta ring, the other end of each central strap being connected to a second Delta ring, said first strap being connected to said first Delta ring and said second strap being connected to said second Delta ring.

* * * * *